United States Patent
Wu et al.

(10) Patent No.: US 6,631,565 B2
(45) Date of Patent: Oct. 14, 2003

(54) ALIGNMENT TOOL FOR ASSEMBLING A REAR PLATE AND A FRAME OF A FLAT DISPLAY PANEL

(75) Inventors: Jiun Ham Wu, Sanchung (TW); Chien-Hsing Li, Taichung (TW); Po-Cheng Chen, Yunghe (TW)

(73) Assignee: Acer Display Technology, Inc., Hsinchu (TW)

( * ) Notice: Subject to any disclaimer, the term of this patent is extended or adjusted under 35 U.S.C. 154(b) by 0 days.

(21) Appl. No.: 09/865,453

(22) Filed: May 29, 2001

(65) Prior Publication Data

US 2001/0039744 A1 Nov. 15, 2001

(30) Foreign Application Priority Data

Sep. 5, 2000 (TW) ...................................... 89215420 U

(51) Int. Cl.[7] .............................................. G01D 21/00
(52) U.S. Cl. .............................. 33/645; 33/613; 33/533
(58) Field of Search .......................... 33/533, 613, 645, 33/286

(56) References Cited

U.S. PATENT DOCUMENTS

| | | | | | |
|---|---|---|---|---|---|
| 2,630,631 A | * | 3/1953 | McMullen | ................... | 33/549 |
| 4,559,712 A | * | 12/1985 | Kubetin | ................... | 33/1 BB |
| 4,676,005 A | * | 6/1987 | Seligman | ................... | 33/533 |
| 4,721,365 A | * | 1/1988 | Nishimura | ................... | 33/613 |
| 5,456,018 A | * | 10/1995 | Irlbeck et al. | ................... | 33/645 |
| 6,332,275 B1 | * | 12/2001 | Tsai et al. | ................... | 33/1 BB |

FOREIGN PATENT DOCUMENTS

| | | | | | |
|---|---|---|---|---|---|
| EP | 276900 A2 | * | 8/1988 | ................ | 33/645 |
| GB | 2192719 A | * | 1/1988 | ................ | 33/533 |

* cited by examiner

*Primary Examiner*—Diego Gutierrez
*Assistant Examiner*—Madeline Gonzalez
(74) *Attorney, Agent, or Firm*—Troxell Law Office PLLC

(57) ABSTRACT

An alignment tool for assembling a rear plate and a frame of a flat display panel is introduced. The rear plate includes a front surface, a rear surface opposing to the front surface for adhering with the frame in an aligning process, and an alignment mark located at the front surface. The alignment mark has a predetermined thickness and is protruded from the front surface. The alignment tool includes a base, a clamp arm and an upper arm. The base further includes a base top surface and an alignment notch. The base top surface is used for contacting with the front surface of the rear plate and the alignment notch has at least two alignment sides for matching with the alignment mark. The clamp arm is protruded from the base, and the upper arm is protruded from the clamp arm and used for aligning with the frame. The upper arm includes an arm lower surface parallel to and spaced apart from the base top surface by a predetermined distance for forming an open space in between. The rear plate is sandwiched in the open space during the aligning process, and the alignment mark is leaned upon the alignment sides of the alignment notch, such that the alignment mark is inserted into the alignment notch.

11 Claims, 5 Drawing Sheets

ALIGNMENT TOOL FOR ASSEMBLING A REAR PLATE AND A FRAME OF A FLAT DISPLAY PANEL

BACKGROUND OF THE INVENTION (1) Field of the Invention

The invention relates to an alignment tool for assembling a rear plate and a frame of a flat display panel, and more particularly to a tool which utilizes an alignment mark having a substantial thickness located on the rear plate to align the rear plate and the frame prior to an adhesion process.

(2) Description of the Prior Art

Referring to FIG. 1, a perspective view of a conventional flat display panel (usually seen in a plasma display) is shown to illustrate the position of a metal frame 3, a glass rear plate 2 and a glass front plate 1. After assembling the front plate 1 and the rear plate 2, the metal frame 3 is overlapped and adhered to a rear surface 22 of the rear plate 2 by a binder, for example, a 3M VHB-type dual-side glue. In practice, the alignment accuracy between the frame 3 and the rear plate 2 is extremely important for the following assembling process of the display panel. The alignment accuracy in between strongly relates to the installation of the electronic elements onto the frame 3 and the electrical connection between the rear plate 2 and the front plate 1 because the electrical connection is usually made by bypassing the sides of the frame 3. In the art, two types of alignment methods are usually used for assembling the rear plate 2 and the frame 3, including a manual aligning method and a mechanical aligning method.

Please refer to FIG. 2 which is a schematic view showing the conventional manual aligning method for assembling the glass rear plate 2 and the metal frame 3. As shown, flat alignment marks 21 without a substantial thickness formed at on the front surface 20 of the rear plate 2. Besides, corresponding alignment notches 31 are formed on the frame 3. A conventional alignment tool 4 having an inspection window 41 is firstly positioned on the rear surface 22 of the rear plate 2 in the manual aligning method, and the inspection window 41 is lying on top of the alignment mark 21. Then, a top protrusion (not shown) of the alignment tool 4 can be used to align with the alignment notch 31 of the frame 3. After the alignment is done, the alignment tool 4 can be removed. The dual-side glue is arranged between the rear plate 2 and the frame 3 in advance, so the frame 3 is then lowered down and adhere to the rear plate 2. Nevertheless, the prior manual aligning method presents following disadvantages.

1. The alignment mark 21 is electroplated on the front surface 20 of the rear plate 2, and the alignment operator observes the mark 21 from the rear surface 22 of the rear plate 2. The visional deviation may occur in the alignment process because the rear plate 2 has a thickness of 3 mm at least in FIG. 2. Therefore, the error in this kind of aligning work has an extended degree of human dependence.

2. Some clamps are usually used to fix the alignment tool 4 and the rear plate 2 in the prior alignment method. The clamp forcing might vary case by case due to some human factors, therefore, breaking or cracking of the rear plate 2 is happened when a undue force is applied. Besides, the position shift between the rear plate 2 and the alignment tool 4 may occur when the clamp force is insufficient.

On the other hand, the mechanical aligning method may waive the human factors so that aforesaid disadvantages can be eliminated. Yet, following restrictions may still be happened in the mechanical aligning method.

1. The cost of the machine is high. Due to a high accuracy, optical automatic positioning mechanism and driving mechanism cannot be substituted by some low-price elements.

2. The machine has a poor suitability. As long as the machine is setup, it is difficult to adjust the machine in time according to different products.

Therefore, a simplified, low-cost, and high accuracy alignment tool should be developed.

SUMMARY OF THE INVENTION

Accordingly, it is a primary object of the present invention to provide an alignment tool for assembling a rear plate and a frame of a flat display panel which is simply operated, low-cost, and high precision in aligning the rear plate with the frame.

It is another object of the present invention to provide an alignment tool for assembling a rear plate and a frame of a flat display panel, in which an alignment mark with a substantial thickness is provided to cooperate with an alignment notch so that the aligning operation can be speeded up and aforesaid human factors can be eliminated.

It is a further object of the present invention to provide an alignment tool for assembling a rear plate and a frame of a flat display panel, in which a roller-type fastening mechanism is provided to clamp the rear plate and the alignment tool.

In accordance with the present invention, the alignment tool is operated between the rear plate and the frame during an aligning process. The alignment tool includes a base, a clamp arm and an upper arm. The rear plate includes a front surface, a rear surface opposing to the front surface and adhering with the frame, and an alignment mark formed on the front surface with a predetermined thickness and protruded from the front surface. The base of the alignment tool further includes a base top surface and an alignment notch. The base top surface contacts with the front surface of the rear plate, and the alignment notch has at least two alignment sides to match with the alignment mark.

The clamp arm is protruded from the base of the alignment tool, and the upper arm is protruded from the clamp arm. The upper arm for aligning with the frame has an arm lower surface parallel to and spaced apart from the base top surface by a predetermined distance and forming an open space in between. The arm lower surface contacts with the rear surface of the rear plate during the aligning operation.

In the present invention, the rear plate is sandwiched within the open space between the base top surface and the arm lower surface during the aligning process. The alignment mark is leaned upon the alignment sides of the alignment notch so that the alignment mark is inserted into the alignment notch and the upper arm is positioned in the aperture of the frame. By providing the design of the alignment mark and the alignment notch, the aligning process can be done without eye deviation.

In the present invention, the rear plate can further include a lateral side connecting the front surface and the rear surface, and the alignment tool includes an inner vertical surface adjacent to the open space. The lateral side of the rear plate is positioned next to the inner vertical surface while the inner vertical surface is aligned with the rear plate.

In one embodiment of the present invention, the alignment notch can be formed as a wedge-shaped opening for providing two lateral sides as the alignment sides. In one embodiment of the present invention, the alignment mark includes at least two slanted edges for respectively matching with the alignment sides of the alignment tool and for sliding into the alignment notch during the aligning process.

In another embodiment of the present invention, the frame has an aperture, and the alignment tool includes a base, a clamp arm and an upper arm. The upper arm further includes an arm lower surface and an alignment element, the alignment element can align to the aperture of the frame, and the lower surface is parallel and spaced apart from the base top surface by a predetermined distance and forming an open space in between. The arm lower surface contacts with the rear surface of the rear plate during the aligning process. The upper arm can further include a lower opening and an interior accommodation space for accommodating a fastening mechanism. A portion of the fastening mechanism is exposed from the lower opening. By using the fastening mechanism, the rear plate can be gradually fastened between the the upper arm and the base while the alignment tool is feeding toward the rear plate.

The fastening mechanism can include a roller spaced apart from the arm lower surface a distance. The roller can move along a predetermined track to shorten the distance between the roller and the arm lower surface of the upper arm while feeding the alignment tool toward the rear plate. Furthermore, the roller can rotate by a pivot shaft for moving along the track. The roller can be a wheel, a ball, or any the like. The material for the roller can be a rubber, a plastic material, a cloth, or any compressible material the like.

The fastening mechanism can be a wedge having a narrower end, and the interior accommodation space of the upper arm can be shaped as a wedge-shaped space having a restricted end. The narrower end of the wedge and the restricted end of the wedge-shaped space are located close to the clamp arm so as to gradually fasten the rear plate between the lower surface of the upper arm and the top surface of the base while feeding the alignment tool toward the rear plate. Similarly, the material for the wedge can be a rubber, a plastic material, a cloth, or any resilient material the like.

All these objects are achieved by an alignment tool for assembling a rear plate and a frame of a flat display panel described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed an alignment tool for assembling a rear plate and a frame of a flat display panel. It will be appreciated by one skilled in the art that variations of these specific details are possible while still achieving the results of the present invention. In other instance, well-known components are not described in detail in order not to unnecessarily obscure the present invention.

Figure 1:
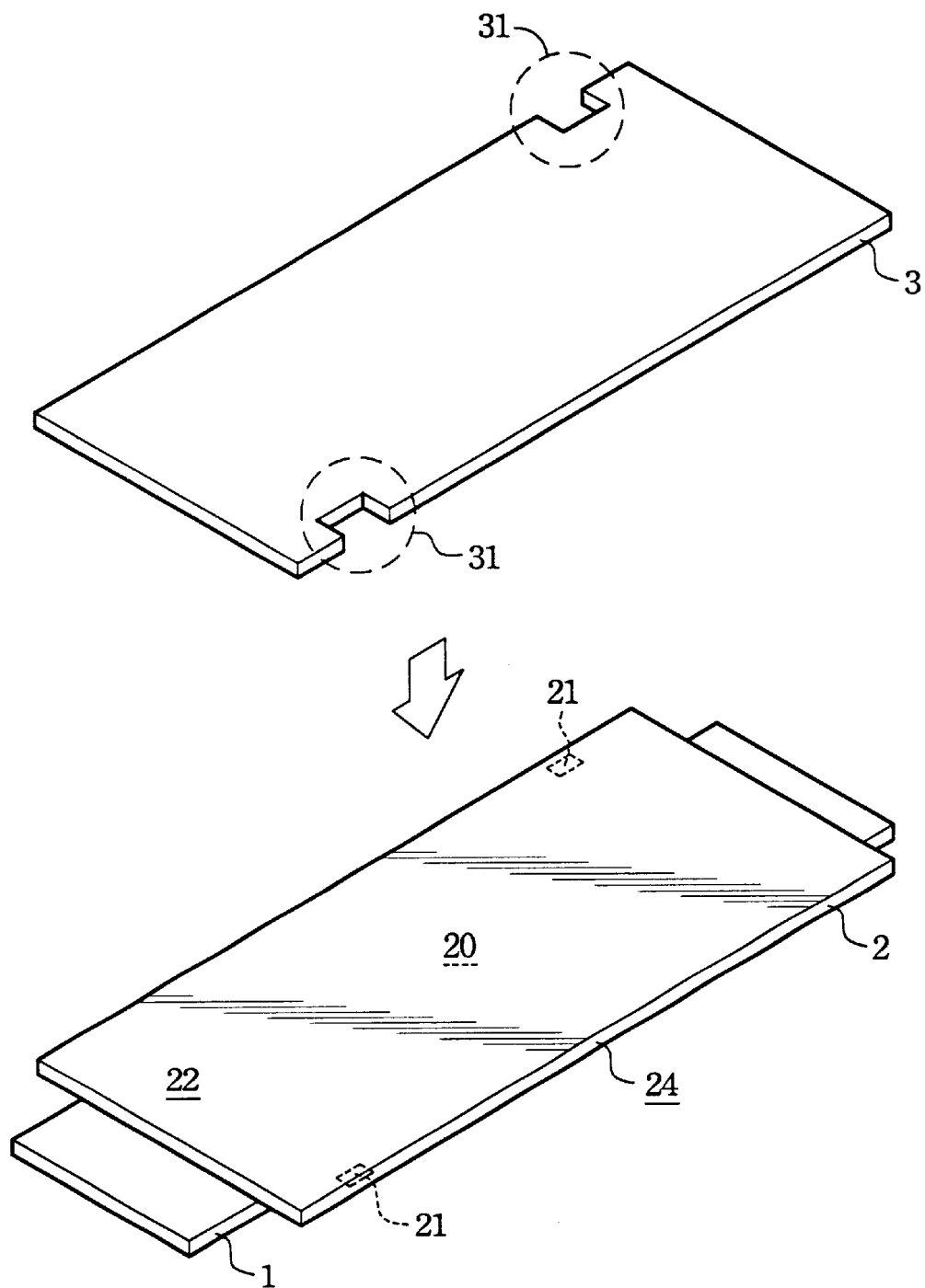
FIG. 1 is a diagram showing the relationship among a metal frame, a glass rear plate and a glass front plate of a conventional flat display panel.
Figure 2:
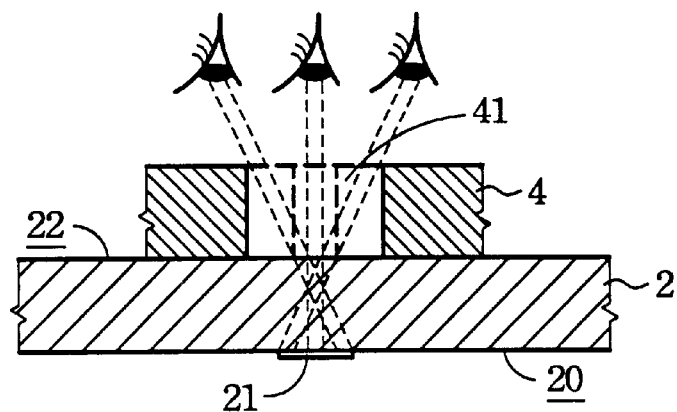
FIG. 2 is a schematic view showing a manual aligning method for assembling the glass rear plate and the metal frame in the prior art.
Figure 3:
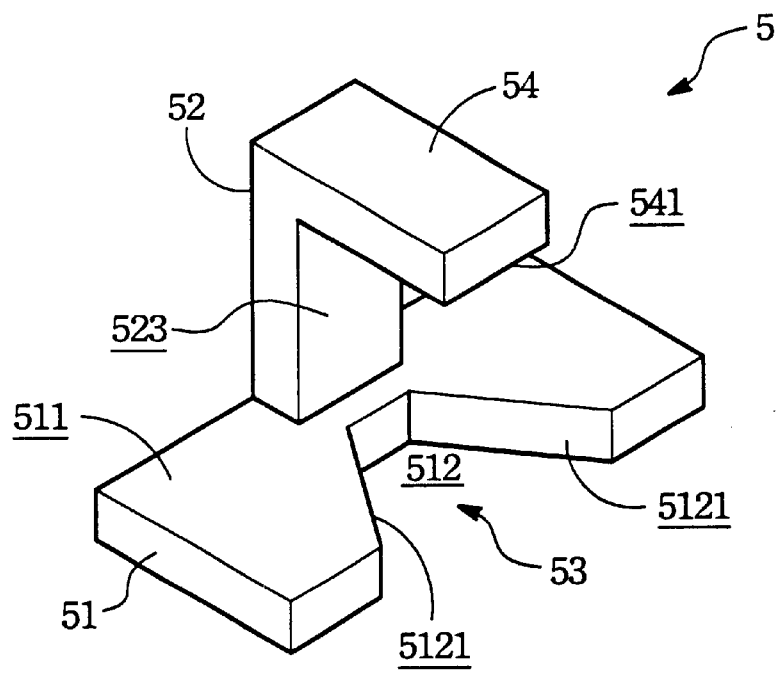
FIG. 3 is a perspective view of a preferred embodiment of an alignment tool for assembling a rear plate and a frame of a flat display panel in the present invention.

Referring now to FIG. 3, a perspective view the alignment tool in the present invention is shown. The alignment tool 5 is used to assist the alignment of the glass rear plate and the metal frame. The rear plate 2 (shown in FIG. 1 and FIG. 2) includes a front surface 20, a rear surface 22, and an alignment mark. The rear surface is positioned opposing to the front surface 20 and contacts with the frame 3 during the aligning process. In the present invention, the alignment mark 21 has a predetermined thickness and is protruded from the front surface 22 of the rear plate 2. The frame 3 (see FIG. 1) has an aperture 31 for aligning with the alignment tool 5.

As shown in FIG. 3, the alignment tool 5 of the present invention includes a base 51, a clamp arm 52 protruded from the base 51, and an upper arm 54 protruded from the clamp arm 52.

The base 51 has a top surface 511 and an alignment notch 53, the top surface contacts the front surface 20 of the rear plate 2, and the alignment notch 512 provides at least two alignment sides 5121 to match with the alignment mark 21 during the aligning process.

The clamp arm 52 is protruded from the base 51, and the upper arm 54 is further protruded from the clamp arm 52. The upper arm 54 includes an arm lower surface 541 parallel to and spaced apart from the top surface 511 of the base 51 by a predetermined distance for forming an open space 53 between the upper arm 54 and the base 51. During the aligning process, the arm lower surface 541 contacts the rear surface 22 of the rear plate 2, and the open space 53 is used to receive the rear plate 2.

Figure 4A:
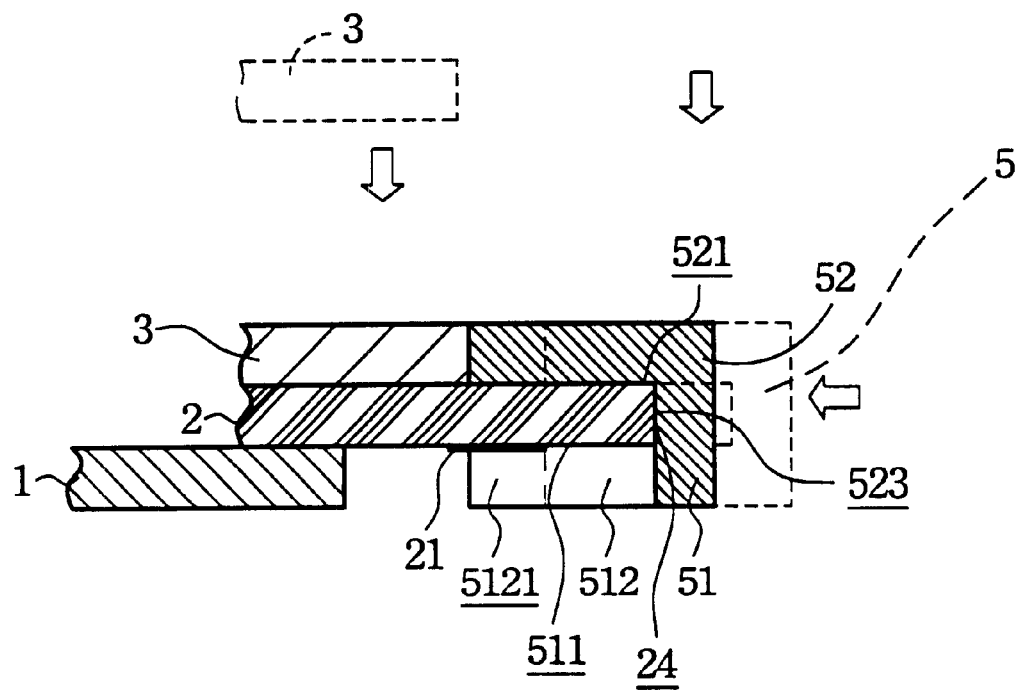
FIG. 4A is a cross sectional view showing the operation of the alignment tool in FIG. 3.

Referring to FIG. 4A, a cross sectional view showing the operation of the alignment tool 5 is illustrated. FIG. 4 is shown along a centerline of the alignment notch 512. The rear plate 2 further includes a lateral side 24 connecting the front surface 20 and the rear surface 22. Besides, the clamp arm 52 has an inner vertical surface 523 adjacent to the open space 53, and the lateral side 24 is positioned next to the inner vertical surface 523 while the alignment tool is aligned with the rear plate 2.

Figure 4B:
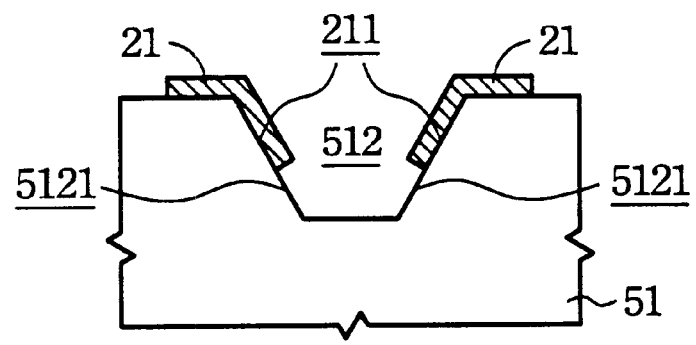
FIG. 4B is a schematic view showing the position of an alignment notch of the alignment tool and an alignment mark of the rear plate.

While the rear plate 2 and the frame 3 are aligned by the alignment tool 5, the rear plate 2 is sandwiched in the open room 53 between the base 51 and the upper arm 54, and the upper arm 54 is inserted into the aperture 31 of the frame 3. Referring to FIG. 4B, a schematic view showing the alignment between the alignment notch 512 and the alignment marks 21 is present. After the aligning process is done, the alignment marks 21 leaned against the alignment sides 5121 of the alignment notch 512 to ensure the alignment between the rear plate 2 and the alignment tool 5. In this embodiment, pair of alignment marks 21 is present to match with a single alignment notch 512. However, a single alignment mark 21 can also be used to provide a pair of sides 211 to match the alignment sides 5121 of the alignment notch 512 as shown in FIG. 4C.

Figure 4C:
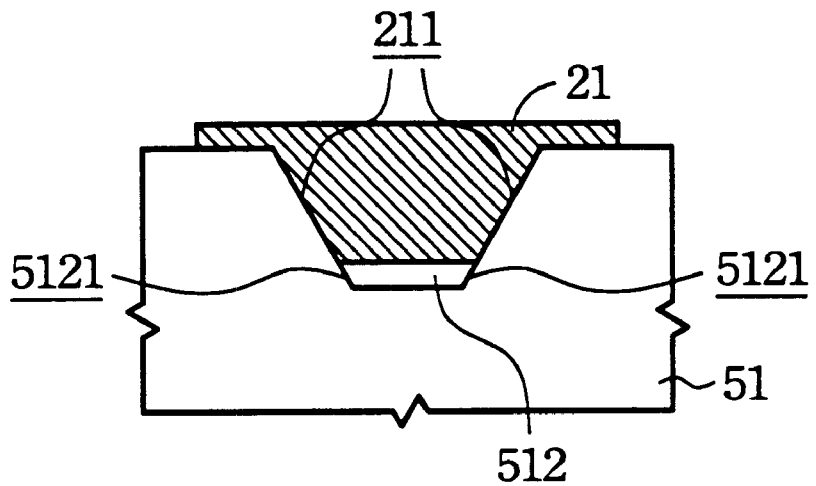
FIG. 4C is a schematic view showing the position of the alignment notch of the alignment tool of and another alignment mark of the rear plate.
Figure 5:
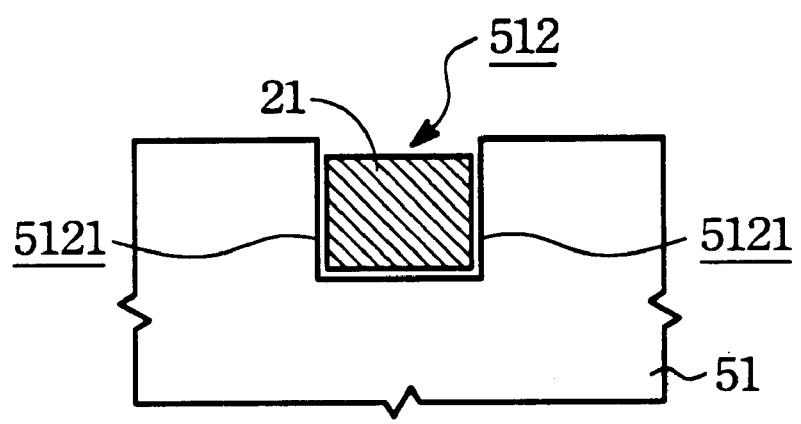
FIG. 5 is a schematic view showing the relationship of an alignment notch of another alignment tool and an alignment mark of the rear plate.

Referring to FIG. 3, FIG. 4B and FIG. 4C, the alignment notch 512 is a wedge-shaped opening for providing two slanted sides as the alignment sides 5121. Yet, the sharp of the alignment notch 512 can be varied. For example, as shown in FIG. 5, a rectangular alignment mark 21 and a respective rectangular alignment notch 512 are applied. Similarly, the alignment notch 512 can be a hole or a cavity (not shown) rather than the opening as shown in previous embodiments. When the alignment mark 21 is thin, the base 51 of the alignment tool 5 can slide over the alignment mark 21 when feeding the alignment tool 5, so that the alignment mark 21 still can match with the hole-shaped alignment notch 512.

Figure 6:
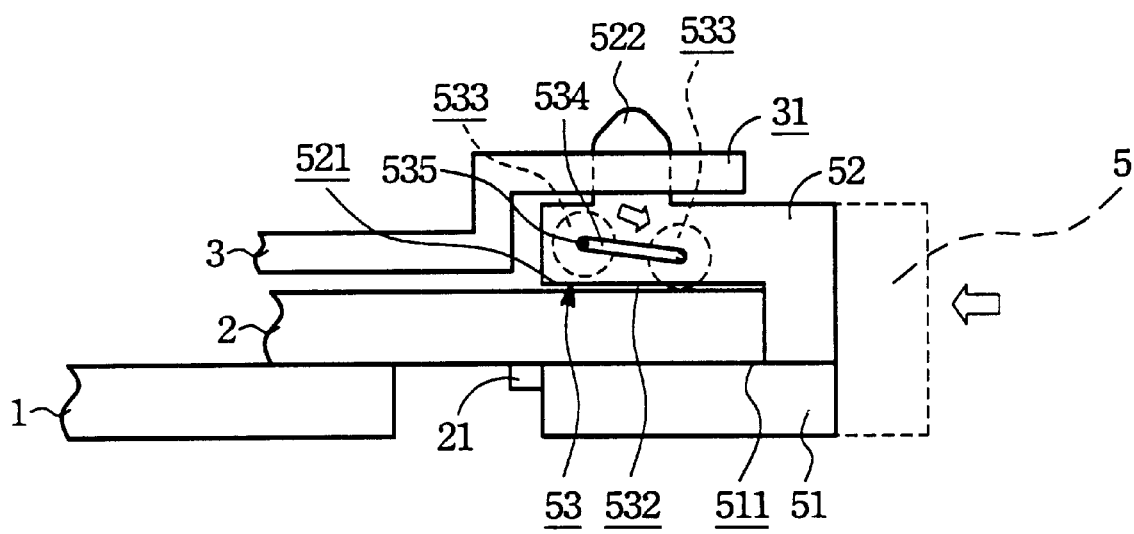
FIG. 6 is a side view of another preferred embodiment showing an alignment tool with a fastening mechanism in the present invention.

Referring to FIG. 6, a side view of the alignment tool 5 in a further embodiment is shown. In this embodiment, the alignment tool 5 further includes an alignment element 522 for aligning with the aperture 31 of the frame 3. In addition, the upper arm 54 further includes a lower opening 532 at the lower surface 541 and an interior accommodation space (not shown in the figure) for accommodating a fastening mechanism. A portion of the fastening mechanism is exposed from the lower opening 532. By using the fastening mechanism, the rear plate 2 can be fastened gradually between the lower surface 541 of the upper arm 54 and the top surface 511 of the base 51 while the alignment tool 5 is feeding toward the rear plate 2 (as the arrow direction shown in FIG. 6).

As shown in FIG. 6, the fastening mechanism of the alignment tool 5 has a roller 533 spaced apart from the arm lower surface a distance. The roller can move along a predetermined track 534 when feeding the alignment tool 5 toward the rear plate 2, so that the distance between the roller 533 and the arm lower surface 541 can be shortened gradually. Thereby, the roller 533 can gradually press the rear plate 2 during feeding the alignment tool 5, and so that the rear plate 2 can then be firmly held between the upper arm 54 and the base 51 of the alignment tool 5. In the present invention, the roller 533 can be a wheel, a ball, or any the like, and rotate by a pivot shaft 535 for moving along the track 534. The material of the roller 533 can be a rubber, a plastic material, a cloth, or any compressible material the like.

Figure 7:
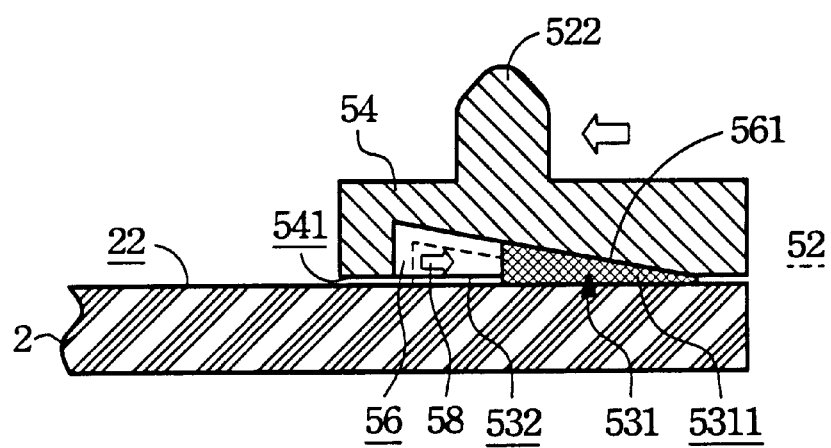
FIG. 7 is a cross sectional view of another fastening mechanism according to the present invention.

Referring now to FIG. 7, another fastening mechanism is shown. In this embodiment, the fastening mechanism is a wedge 531 having a narrow end 5311, and the interior accommodation space 56 of the upper arm 54 is a wedge-shaped space having a restricted end 561. As shown, the narrow end 5311 of the wedge 531 and the restricted end 561 of the wedge-shaped space 56 at the upper arm 54 are located close to the clamp arm 52. When the alignment tool is moved toward the first direction 58 (as shown by the arrow), the wedge 531 moves along the arrow direction 58, the narrow end 5311 will rib against the rear plate 2. Therefore, the rear plate 2 will be fastened gradually between the upper arm 54 and the base 51 while feeding the alignment tool 5 toward the rear plate 2. Similarly, the material for the wedge 531 can be a rubber, a plastic material, a cloth, or any resilient material the like.

The prior vision deviation problems during the aligning process can be reduced by positioning the alignment tool 5 in the front surface of the rear plate 2. By providing a protruded alignment mark 21, the alignment mark 21 will match the alignment sides 5121 of the alignment tool 5, and the aligning process will not be operated by the eye of the operator. By providing the fastening mechanism of the alignment tool 5, the fastening of the rear plate 2 within the open space 53 can be assured. Therefore, the object of the present invention to provide an alignment tool which is simply operated, low-cost and precise in an aligning process can be successfully achieved.

While the present invention has been particularly shown and described with reference to a preferred embodiment, it will be understood by those skilled in the art that various changes in form and detail may be without departing from the spirit and scope of the present invention.

We claim:

1. An alignment tool for assembling a rear plate having opposite front and rear surfaces, and a frame of a flat display panel, the frame having an aperture, comprising:

a) at least one alignment mark with a predetermined thickness extending from the front surface of the rear plate;

b) a base having a top surface and an alignment notch, the alignment notch having at least two alignment sides that are positioned to contact the at least one alignment mark on the rear plate when the rear plate is properly aligned relative to the base;

c) a clamp arm protruding from the top surface of the base;

d) an upper arm protruding from the clamp arm, the upper arm having a lower surface, the lower surface of the upper arm being parallel to and spaced apart from the top surface of the base to form an open space between the upper arm and the base to accommodate the rear plate, whereby the upper arm slidably fits into the aperture of the frame for alignment of the frame relative to the rear plate; and e) an inner vertical surface on the clamp arm adjacent to the open area, the inner vertical surface contacting a lateral side of the rear plate when the rear plate is aligned with the base.

2. The alignment tool according to claim 1 wherein said upper arm further includes an interior accommodation space and a lower opening, a fastening mechanism located in the accommodation space, a portion of said fastening mechanism is exposed from said lower opening, and said fastening mechanism fastening said rear plate between said lower surface of said upper arm and said base top surface while said alignment tool is moved toward said rear plate.

3. The alignment tool according to claim 2 wherein said fastening mechanism further includes a roller, said roller movable along a predetermined track while moving said alignment tool toward said rear plate.

4. The alignment tool according to claim 3 wherein said roller comprises a wheel that moves along said predetermined track by a pivot shaft.

5. The alignment tool according to claim 3 wherein said roller comprises a ball that moves along said predetermined track by a pivot shaft.

6. The alignment tool according to claim 2 wherein said fastening mechanism includes a wedge having a narrow end, said interior accommodation space being a wedge-shaped space having a restricted end, said narrow end of said fastening mechanism moves toward said restricted end of said interior accommodation space in order to fasten said rear plate between said clamp arm and said base top surface of said base.

7. The alignment tool according to claim 2 wherein said fastening mechanism is made of a resilient material.

8. The alignment tool according to claim 7 wherein said resilient material is a rubber.

9. The alignment tool according to claim 7 wherein said resilient material is plastic.

10. The alignment tool for assembling a rear plate and a frame of a flat display panel according to claim 1, wherein the alignment notch is a wedge-shaped opening.

11. The alignment tool for assembling a rear plate and a frame of a flat display panel according to claim 1, wherein the alignment mark has two slanted edges configured to contact the alignment notch.

* * * * *